May 10, 1938.  P. KOPP  2,117,179
APPARATUS FOR PRODUCTION OF MOLDED ARTICLES
Filed July 29, 1932
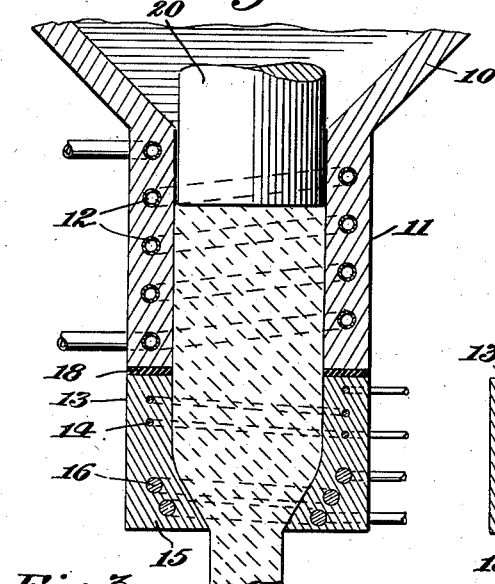
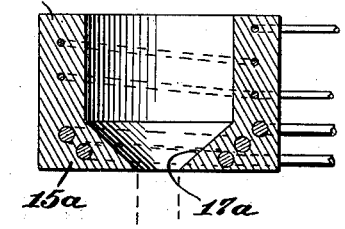
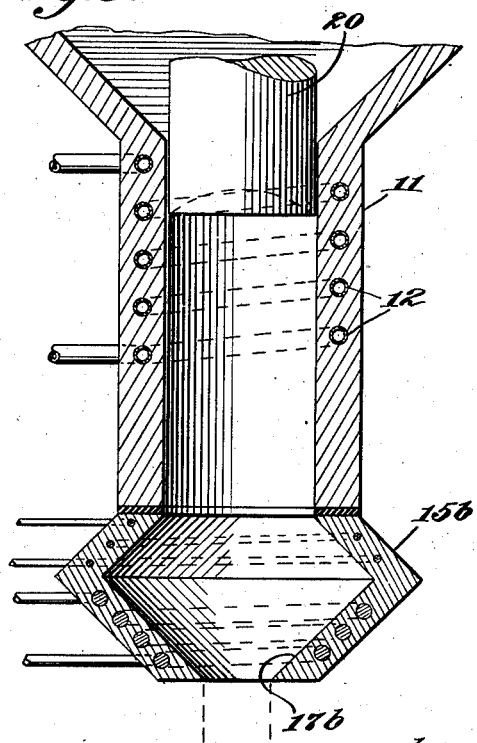
Inventor:
Peter Kopp, Patented May 10, 1938

2,117,179

UNITED STATES PATENT OFFICE 2,117,179

APPARATUS FOR PRODUCTION OF MOLDED ARTICLES

Peter Kopp, Berlin-Friedenau, Germany

Application July 29, 1932, Serial No. 626,082
In Germany July 30, 1931

2 Claims. (Cl. 18—12)

This invention relates to a method of and apparatus for the production of molded and hardened articles from hardenable artificial resin and artificial resin-containing mixes of every kind and concerns improvements in a method and apparatus by means of which it is rendered possible to produce pieces of any desired length from hardenable artificial resin and artificial resin-containing mixes of every kind whilst employing relatively small pressure molds open at the discharge end and of any desired cross sectional shape or profile characterized in that the back pressure necessary for compression is exerted by the molded articles themselves owing to a clamping action which is brought about by the slightly conical construction of the matrices or by the disposal of clamps and the hardened section of compressed article is extruded from the discharge opening by a pressure exceeding the compression pressure whereby, by maintaining a temperature gradient opposite to the direction of pressure, homogeneous connection of the first formed section of compressed article with the section next formed is ensured.

According to the present invention one improvement or modification of the aforesaid method consists in providing a relatively low temperature in the charging zone by cooling the charging end of the mold, the temperature in the remainder of the mold being substantially uniform or non-uniform.

The charging end is with advantage cooled by means of cooling water, which may be passed through the plunger or preferably round the charging end of the mold or both, the uncooled portion of the mold being uniformly or non-uniformly heated, preferably with separate heating of the discharge end.

The temperature gradient opposed to the direction of pressure is therefore increased and the advantage is obtained that premature hardening of the individual sections of compressed article, before production of homogeneous connection, is more effectively avoided. In this case the requisite clamping action is to be taken into consideration whereby the conicity of the mold is varied, depending upon the pressure and the desired solidity of the end-product. It is therefore possible by varying the conicity to take this factor or the particular properties of the material employed into consideration. It should, however, be understood that the conicity and accordingly the clamping action should not be substantially greater than is necessary for obtaining the desired compression pressure so that as small an additional pressure as possible is necessary for extrusion from the mold. It is therefore not advisable by selecting large conicity to increase the clamping action excessively since in this case although very high compression pressures would be rendered possible, the extrusion would be rendered extremely difficult or even impossible. In any case compression pressures would have to be employed for extrusion which considerably exceed the desired compression pressure, so that unnecessary energy would be used up and the apparatus would have either to be adapted to such a pressure, which is of course technically more difficult and in any case costly, or there would be a danger of the plunger and other parts of the machine becoming bent and broken.

Care must also be taken to ensure that the mold is as absolutely smooth, i. e. as highly polished, as possible and that obstruction, sticking and caking is avoided or, when such obstruction takes place, that the operation is immediately interrupted since the clamping action is very greatly increased by such obstruction so that the hereinbefore described disadvantages result. It is therefore advisable either to employ self-lubricating starting material or to provide for lubrication of the surfaces of the mold or the plunger or both. It is necessary in all circumstances, however, to construct the inner surfaces of the mold as smooth as possible.

In this case it is in certain circumstances advantageous to construct the mold in the form of a double cone, the two cones lying against one another at their largest basal surface. In certain circumstances the construction in the form of a double cone is to be preferred, the inlet end thereby always corresponding to the smaller basal surface of the cone.

By constructing the mold in this way homogeneity of the material is increased and the escape of gases and vapours, evolved owing to the action of heat on the artificial resin, facilitated.

It is also in certain circumstances advantageous to interrupt the temperature gradient at any stage of the operation or in any position of the mold, the fundamental condition being that the discharge end possesses the highest temperature and the inlet end the lowest temperature. Thus it is advantageous in the case of a cool charging zone to employ a comparatively hot zone followed in the direction of working by a colder zone, and if desired by further hot zones followed by colder zones, the heat effect in intermediate hot zone or zones being, of course, so selected that premature hardening or other disadvantages do not occur. The final hardening is thereby again effected in the zone of the discharge end. When the compressed article emerges from the mold care should be taken to provide a guide for the compressed article which may be constructed either as a ring-guide or as a roller-guide with two or more rollers disposed at an angle or in any other manner. The danger of sagging is thereby overcome so that the discharging articles of any desired profilation show almost mathematically parallel edges or limiting surfaces.

Another improvement in or modification of the aforesaid method is to effect automatic dosing with the charging, the dosing apparatus being with advantage disposed separately from the compression apparatus but operable therewith. The dosing may be effected by introducing measured-off portions of powder or by employing tablets: and the plunger operates to compress each successive charge and therewith cause an advancement of the entire mass of material along the molding passage.

The introduction may be effected through a hopper which is maintained cold or separately cooled and is disposed at the charging end or—and this modification has proved to be advantageous—the charging may take place through the plunger. In this case the plunger when imparting the pressure is, of course, so closed that the whole surface of the plunger serves for compression. This is easily attained by disposing in the middle of the plunger a separate auxiliary plunger which is, with advantage, uniformly operated and effects the charging with the aid of the dosed material and after charging closes the compression surface of the main plunger.

It has been found that the dosing of the starting material introduced is of considerable importance for the density and uniformity of the end-product, it being in general the rule that with proportionately small charges the density of the end-product at constant compression pressure rises. It is, therefore, advisable to keep the quantity of charge small with uniform high compression pressure, whereby, of course, excessive pressure must be avoided.

Uniform density is then ensured by uniform charging, whereas with insufficiently exact dosing, differences in the density of the end-product are to be feared which, in certain circumstances, may render the product unserviceable or at any rate of inferior quality.

The compression surface of the main plunger is preferably constructed absolutely plane or concave. Thereby the occurrence of forces in the wrong direction is avoided and wedge effects do not occur. This is of considerable importance, since with the appearance of wedge effects, stoppages may take place which may render not only the mold but also the press itself, absolutely unserviceable.

By means of this invention the aforesaid method is particularly improved in that the uniformity and quality of the end-products is enhanced.

Figure 1 is a diagrammatic sectional view through a molding apparatus according to the present invention.

Figure 2 is a corresponding view of a discharge end which may be interchanged with the discharge end of Figure 1.

Figure 3 is a view corresponding to Figure 1, but showing a different type of discharge end.

In the drawing, the apparatus is shown to comprise a hopper portion 10 for delivering the moldable material into the upper section 11 of the molding apparatus, this upper section being provided with a coil 12 for the introduction of water for cooling this inlet portion of the mold. An intermediate portion 13 of the mold is provided with means, such as the coil 14, for heating it. A base or extrusion section 15 is similarly provided with means 16, indicated as a heating coil, for heating it to a temperature sufficient for the hardening of the material. This lower section 15 is provided with an internal convergently conical surface 17 leading to a discharge orifice. It is further preferred to employ insulating members 18 between the several sections of the mold, to maintain a definite heat gradient along the walls and to avoid excessive heating of the inlet portion of the molding apparatus by the conduction of heat.

In Figure 2 the interchangeable discharge section 15a has an internal conical surface 17a of greater conicity, i. e. with a larger apex angle, but with the same diameter for junction with the intermediate section 13 of Figure 1, for example. Hence the discharge orifice of the interchangeable piece in Figure 2 is of much less diameter, and a smaller article is made thereby and a greater pressure employed than with the piece 15 of Figure 1.

In Figure 3, the inlet and intermediate portions of the molding apparatus are substantially the same as in Figure 1, but the lower section 15b is in the form of a double cone so that its successive sections in planes at right angles to the axis at first increase in area and then decrease until the lower convergently conical surface 17b ends in a discharge orifice which is smaller than the internal diameter of the inlet section 11 of the molding apparatus.

A plunger 20 operates in conjunction with the molding apparatus and closely fits within the portions 11 and 13 in Figure 1, for example, to establish a pressure upon the moldable material sufficient to compress it to the desired degree and to cause extrusion through the outlet orifice. The conicity of the internal surface 17 causes a back pressure which may be regulated by interchanging such surfaces to attain the desired resistance for establishing the degree of compression desired.

The plunger 20 in Figure 1 is shown as having a plane end surface for engaging the moldable material while the corresponding plunger 20a in Figure 3 has a concave end surface.

What I claim is:

1. An apparatus for the continuous production of uniform form-maintaining molded and finally hardened articles of unlimited length from hardenable artificial resin and artificial-resin containing materials, comprising a mold providing a short passage of substantially uniform cross-section, and an interchangeable nozzle portion for providing an open discharge end for said passage and having convergent internal walls terminating at the discharge end for restricting the movement of said material through the mold, said portion being constructed and arranged with the angle of said convergence for opposing predetermined resistance to the movement of said material, means for cooling the inlet of the mold, means for heating said interchangeable portion so that the maximum temperature exists closely adjacent the discharge end thereof whereby a predetermined heat condition may be established and maintained in the material for a time to effect the hardening of said material at said discharge end, and means for moving the material along said passage into and through said discharge end whereby said restricted portion may create a back pressure for effecting the establishment of said heat condition.

2. An apparatus as in claim 1, in which said nozzle has an internal cavity in the form of a double cone with divergent portions providing a transition from said substantially uniform cross-section to a larger cross-section and then convergent portions providing a diminution of cross-sectional area to a discharge opening of area less than said uniform cross-section, and said heating means includes means for warming the divergent portions and means for highly heating said convergent portions.

PETER KOPP.